April 22, 1941. H. E. ANDERSON 2,239,186
BRAKE BEAM
Filed Dec. 31, 1937 2 Sheets-Sheet 1
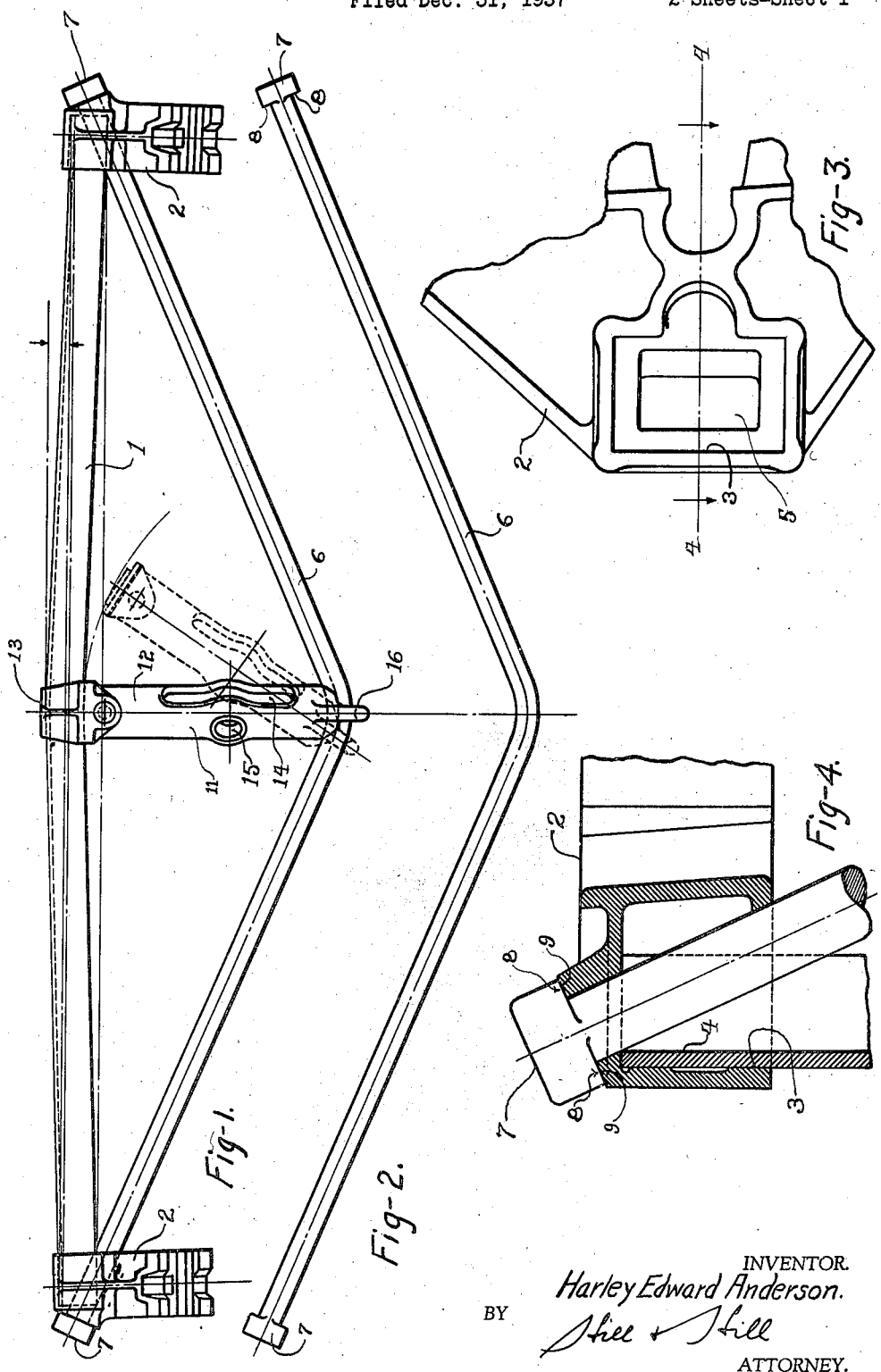
INVENTOR.
Harley Edward Anderson.
BY Hill & Hill
ATTORNEY.

April 22, 1941.    H. E. ANDERSON    2,239,186
BRAKE BEAM
Filed Dec. 31, 1937    2 Sheets-Sheet 2
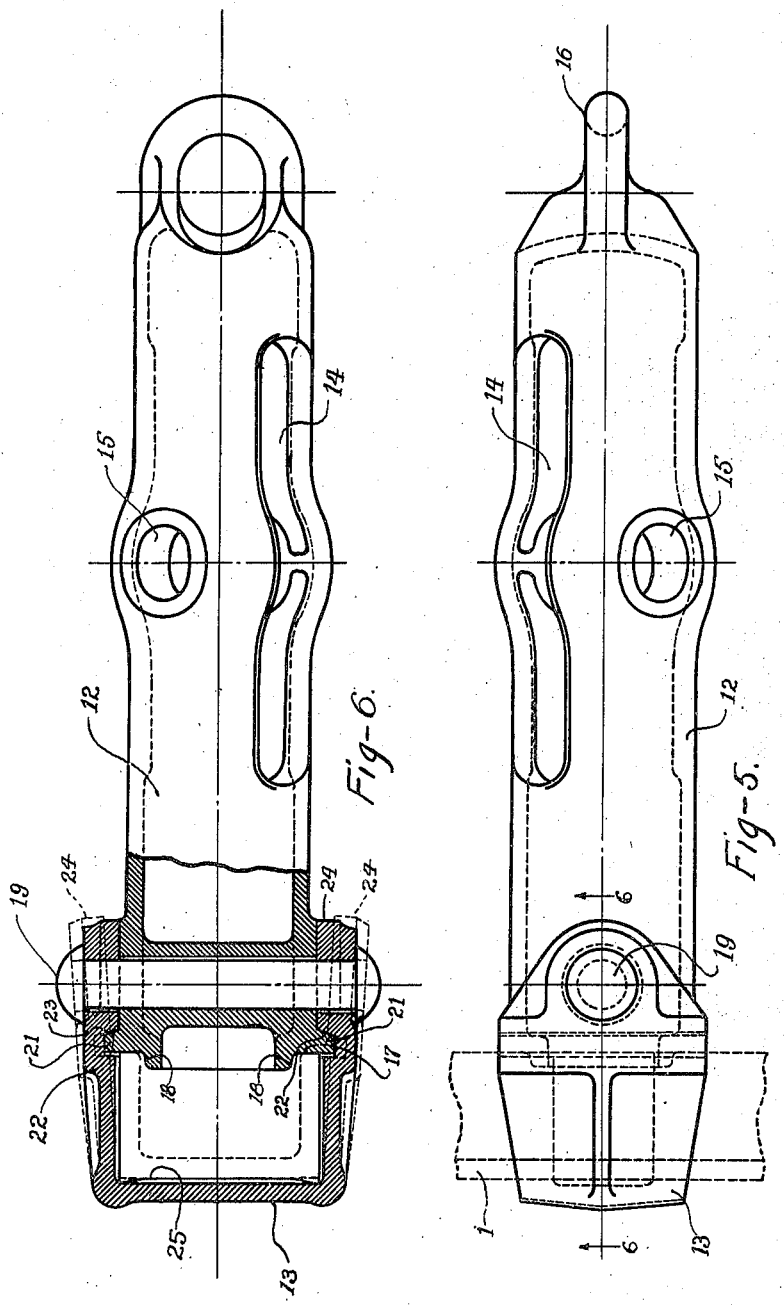
INVENTOR.
Harley Edward Anderson.
BY
Hill & Hill
ATTORNEY.

Patented Apr. 22, 1941

2,239,186

UNITED STATES PATENT OFFICE 2,239,186

BRAKE BEAM

Harley E. Anderson, Chicago, Ill., assignor of one-half to W. F. White, Fort Worth, Tex.

Application December 31, 1937, Serial No. 182,757

2 Claims. (Cl. 188—228)

The invention relates to brake beams and more particularly to the construction of truss type beams. The ordinary beam of this type comprises a compression member and a tension member fastened together through brake heads. It is customary to employ a tension member whose ends are threaded, the threaded ends then being inserted through the brake heads, a strut being placed between the compression and tension members after which nuts are tightened down on the threaded portion, these nuts being drawn up far enough to give the desired camber to the compression member. As a result of the threading of the ends of the tension member, the latter is weakened and subject to breakage adjacent the anchorage to the compression member or brake heads. Various devices have been employed such as special sleeves and collars in conjunction with the threaded end to reduce this breakage.

The present invention has as one of its objects the production of a beam in which the tension member is so designed that threads are unnecessary, also eliminating any necessity for the devices previously mentioned. The tension member thus having no threaded portion is much stronger and more durable than the old threaded member.

Another object of the invention is the production of a beam of the type described which requires comparatively fewer operations in the making and the assembling thereof.

Another object of the invention is the production of a beam of the type described having relatively few parts, thus limiting the possibilities of breakage.

In the drawings wherein like reference characters represent like or corresponding parts:

Fig. 1 is a plan view of a brake beam embodying the features of the invention:

Fig. 2 is a plan view of the tension member employed;

Fig. 3 is a fragmentary view of the brake head;

Fig. 4 is a sectional view taken on the line 4—4 of Fig. 3, and showing a portion of the tension member;

Fig. 5 is a plan view of the brake strut used in combination with the compression and tension members; and Fig. 6 is a side view of the strut with a partial section taken on the line 6—6 of Fig. 5.

Referring now to the drawings, and more particularly to Figs. 1 through 4, the beam comprises a compression member 1 of substantially U-shaped cross section, carrying a brake head 2 adjacent each end thereof, the brake heads having a recessed portion 3 adapted to receive the end 4 of the compression member, similar to the ordinary construction. The brake head is provided with an elongated opening 5 therein through which the ends of the V-shaped tension member 6 are adapted to extend. The latter is provided with an elongated or T-shaped head 7 adjacent each end thereof of a size to enter the elongated opening 5. The heads 7 are so positioned on the ends of the tension member 6 that they may be inserted in the opening 5 of the brake head 2 only when the brake head is rotated approximately 90 degrees from relative operating position. Thus, when the brake heads and tension member are rotated back into relative position, the elongated portions 8 of the head 7 will seat on the brake head adjacent the narrow portion of the opening 5 as shown at 9 of Fig. 4.

Cooperating with the compression member, tension member and brake heads is a strut designated generally by the numeral 11 which comprise a body portion 12 and a cooperating U-shaped member 13, the body member 12 being of such length to give the compression member the desired camber when said body member is seated in relative operative position with relation to the compression member and the tension member, and is adapted to be sprung into said position. The body member 12 is provided with the usual slot 14 and bearing 15 adapted to receive and carry the brake lever in the usual manner, said member being provided at the end adjacent the tension member with a loop portion 16 adapted to encircle the tension member, as shown in Fig. 1, the opposite end being provided with a bearing surface 17 adapted to engage the compression member. Flanges 18 adjacent the inner side wall of the compression member are provided to align the body member 12 with the compression member. The U-shaped cap 13 is adapted to encircle the compression member 6 and clamp the latter to the body portion 12 of the strut by means of a bolt or a rivet 19. The end of the body member 12 is provided with shoulders 21, the inner face 22 thereof being slightly inclined, the adjacent portion 23 of the cap 13 being similarly formed. The cap 13 is so formed that the ends 24 thereof are spaced slightly more than when seated so that as they are drawn together when fastened to the strut 11, the cam action of the inclined surfaces 22 and 23 will have a tendency to draw the cap 13 toward the body member 12, thus securely clamping the compression member 1 between the bearing surfaces 17 of the body member 12 and the portion 25 of the cap 13.

The beam is constructed and assembled in substantially the following manner: The tension member 6, formed from a cylindrical rod, is bent more or less as shown in Figs. 1 and 2 and an elongated head 7 is forged on one end thereof. The opposite unforged end is then extended through the loop portion 16 of the strut 11 after which a similar elongated head is forged on the latter end. Each elongated head is then inserted through the elongated opening 5 of the brake heads 2 which are then rotated into relative operative position with respect to the tension member, and each end of the compression member is engaged with its corresponding brake head by springing the tension member 6 sufficiently to allow the ends of the compression member to be inserted into the recess portion 3 of the brake head. The strut 11 is then placed in the position shown by the dotted lines in Fig. 1, whereupon the end of the strut adjacent the compression member is rotated or forced into relative operating position, thus springing the compression member 1 and the tension member 6 apart intermediate their ends to provide the desired camber in the compression member, as shown in Fig. 1. The cap 13 is then placed in position and the ends 24 are pinched together or drawn up to the body member 12 by means of a clamp or the like, and the two are then rigidly secured to each other by means of the rivet 19 or its equivalent, thus securely clamping the compression member 1 and the strut 11 together, as previously mentioned.

It will be seen from the above description that I have provided a novel construction in a brake beam of the type described in which there are relatively few parts, and having no threads or other small parts which would be subject to breakage. I have also provided novel means for making and assembling such a beam, in which the compression and tension member are sprung apart intermediate their ends to provide the necessary camber and to maintain them in relative position.

Having thus described my invention it is obvious that various immaterial modifications may be made in the same without departing from the spirit of my invention; hence I do not wish to be understood as limiting myself to the exact method, form, construction, arrangement and combination of parts shown and described or uses mentioned.

What I claim as new and desire to secure by Letters Patent is:

1. In a railway truss type brake beam, a compression member, a V-shaped tension member connected thereto adjacent the ends of the V, and a strut extending from the apex of the V to said compression member, said strut comprising a body member adapted to be sprung into place to maintain the assembly in relative operating position, and a U-shaped clamping member, said clamping member having diverging legs, opposed inclined shoulders on the respective body and clamping members, and means for bringing the legs of said clamping member towards one another and maintain said shoulders in engagement to firmly secure said strut to said compression member.

2. In a railway truss type brake beam, a compression member, a V-shaped tension member connected thereto adjacent the ends of the V, and a strut extending from the apex of the V from said compression member to maintain the assembly in relative operating position, said strut comprising a body member and a clamping member, the latter having diverging legs, opposed inclined shoulders on the respective body and clamping members, and means for bringing the legs of said clamping member towards one another and maintain said shoulders in engagement to firmly secure said strut to said compression member.

HARLEY E. ANDERSON.